United States Patent Office 2,904,058
Patented Sept. 15, 1959

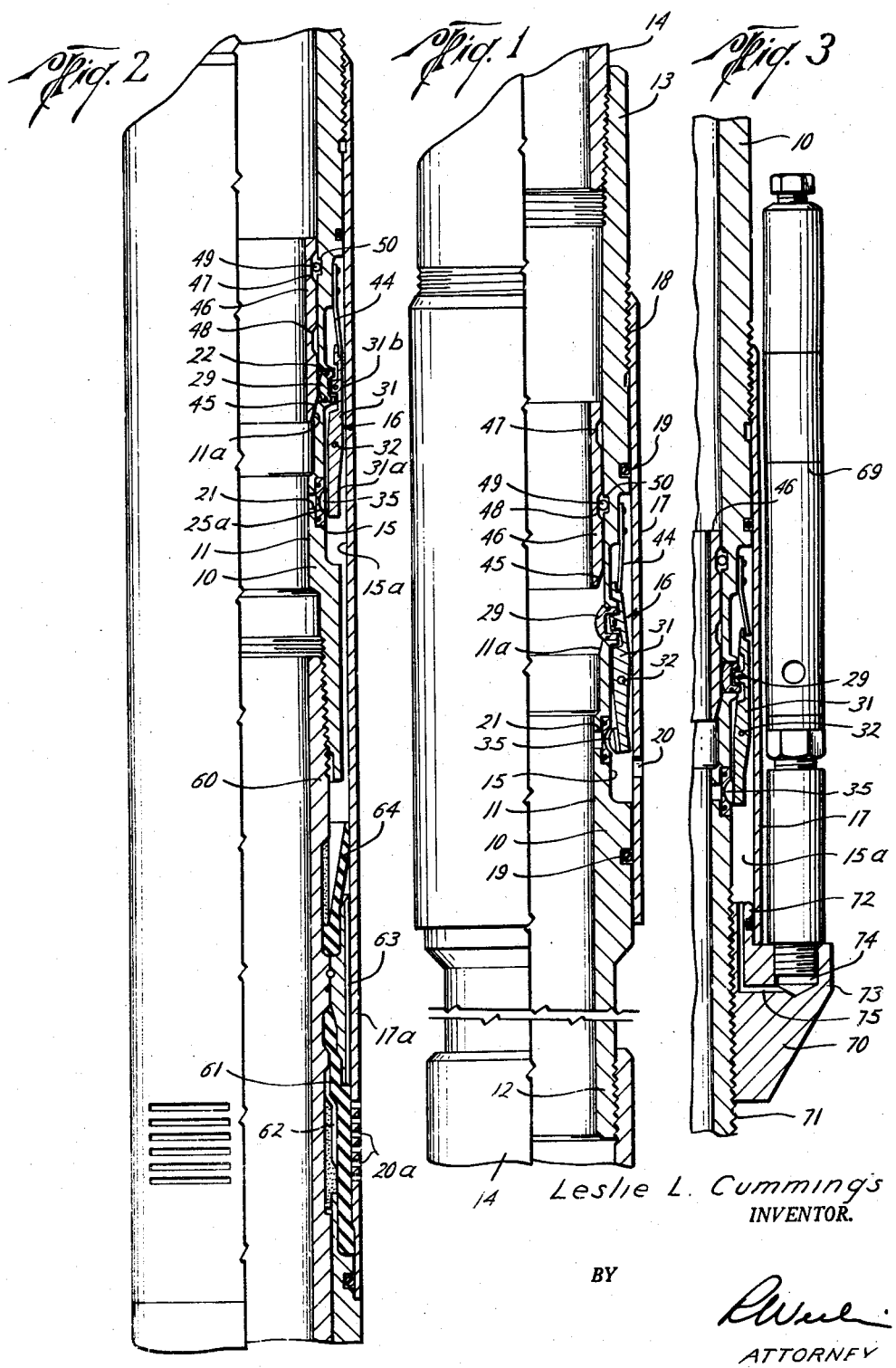

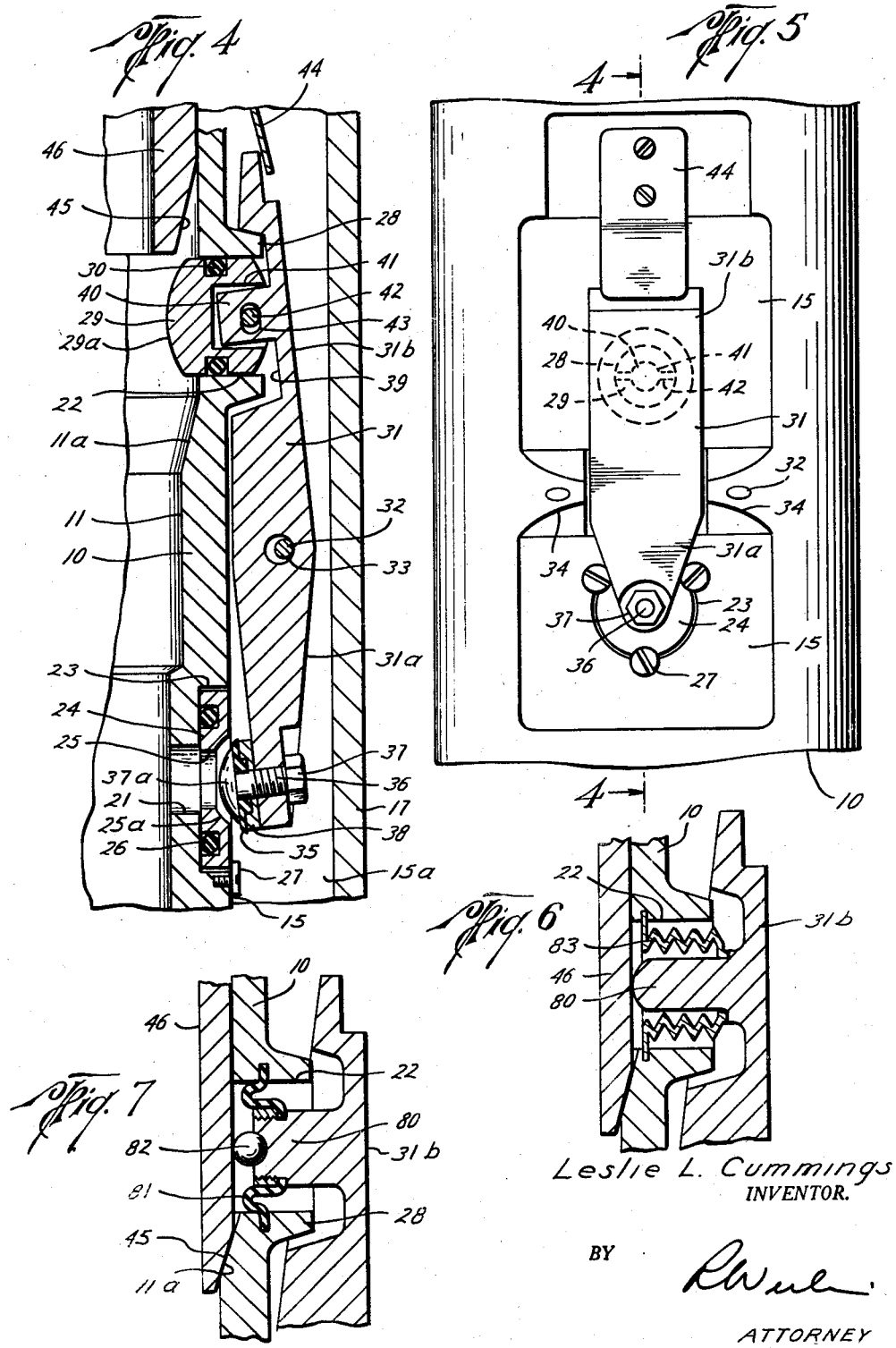

2,904,058
CONTROL VALVE FOR PIPE STRINGS

Leslie L. Cummings, Houston, Tex., assignor, by mesne assignments, to Otis Engineering Corporation, Dallas, Tex., a corporation of Texas Application April 9, 1956, Serial No. 577,052
19 Claims. (Cl. 137—155)

This invention relates to a valve for controlling a flow port in the wall of the tubular body, such as a well pipe.

In many pipe installations in oil and gas wells, it is found desirable to provide one or more flow ports in the wall of the pipe at various elevations in the well for the passage of fluids into and out of the pipe string. In many instances it may be desirable that such flow ports be kept closed for long periods of time and thereafter opened for a particular operation. On the other hand, in some installations the port may be kept open initially and subsequently closed for purposes of operation of a well. Hence, in such installations it is desirable to provide valve means for controlling such ports, which valve means may be opened or closed as may be required, but which will not form substantial obstructions in the bore of the pipe installation, as it is frequently necessary to operate tools through such pipe strings without affecting the valve means.

Installations of this kind which have been coming into use in recent years are those connected with the installation of gas lift valves in a well pipe string where it is not expected that the valves will be required to operate for a substantial period of time after the original installation is made. It is contemplated, in such instances, that when the natural flow of the well has ceased, means should be provided whereby the ports with which the gas lift valves communicate may be opened in order that artificial lifting by gas may be put into operation without the hazard, expense or delay incident to earlier systems which require that the well be "killed" to permit withdrawal of the production pipe for the installation of gas lift valves thereon.

The present invention has for its principal object the provision of a valve construction which will fulfill the requirements outlined above and which will also continue to provide control over the flow port when the valve has been opened. That is, once the valve is put in operation, it will serve as a check valve to permit flow through the port in only one direction, ordinarily from the exterior to the interior of the pipe string.

A further object is to provide a valve construction including a tubular body concentrically enclosed by a tubular casing, the tubular body having a flow port providing communication between the annular space between the body and the casing and the interior of the body, and a valve means controlling the port responsive to differences in fluid pressure between the interior and exterior of the body, the casing having an inlet for the introduction of fluid from the exterior thereof.

A further object is the provision of a valve means of the character described employing a releasable keeper means for holding the valve in its port-closing position.

An additional object is to provide a valve means including a tubular body having a pair of longitudinally spaced openings therein, one of which defines a flow port and the other of which forms a cylinder in which a sealed plunger is reciprocable, the plunger being connected to one arm of a rock lever pivoted on the exterior of the body between the openings, and the other arm of the rock lever carrying a valve member for movement into opening and closing engagement with the flow port in response to reciprocation of the plunger.

An important object is the provision of a plunger-actuated valve of the form described in which the effective area of the plunger exposed to fluid pressure is greater than the area of the flow port.

Other and more specific objects and advantages of this invention will become apparent from the following detailed description when read in conjunction with the accompanying drawing which illustrates several useful embodiments in accordance with this invention.

In the drawing:

Fig. 1 is a longitudinal quarter-sectional view illustrating a valve structure in accordance with one embodiment of this invention, the control valve elements being shown in the open position;

Fig. 2 and Fig. 3 are views similar to Fig. 1 showing the valve structure of this invention in combination with two known types of gas lift valves, the control valve elements being shown in the closed position in each instance;

Fig. 4 is a longitudinal sectional view along line 4—4 of Fig. 5 showing in enlarged view the details of the control valve in accordance with one embodiment of this invention;

Fig. 5 is an elevational view of the control valve structure shown in Fig. 4; and Figs. 6 and 7 are fragmentary sectional views illustrating other embodiments of the sealed plunger means forming a part of the control valve.

Referring to Fig. 1, the valve structure comprises a tubular body 10 having an axial bore 11 and provided at its opposite ends with conventional screw threaded connections 12 and 13 for co-axially connecting the body between sections of a pipe string 14 so as to form a part of the pipe string. Intermediate its ends the exterior of the body is provided with a flattened or recessed area 15 in and on which are located the parts comprising the control valve, designated generally by the numeral 16. Concentrically surrounding the exterior of body 10 to enclose the recessed area and control valve 16 is a generally cylindrical casing 17 which is secured at one end to the body, as by means of a screw threaded connection indicated at 18, positioned at a point above (as viewed in Fig. 1) recessed area 15. The other end of casing 17 extends below recessed area 15 and conventional seal means, such as O-ring seals 19, 19, are installed between casing 17 and portions of body 10 above and below recessed area 15. One or more openings 20 through the wall of casing 17 provide communication between the exterior of the casing and the space 15a between the casing and exterior of body 10 between seals 19—19.

Control valve 16, as best seen in Figs. 4 and 5, includes a pair of longitudinally aligned and spaced-apart openings 21 and 22 extending radially through the wall of body in the recessed area 15. Opening 21 is designated as a flow port and communicates with space 15a which functions as a flow passage connecting openings 20 with flow port 21. The outer end of opening 21 is counter-bored to provide the concentric annular seat receptacle 23 adapted to receive an annular valve seat bushing 24 having the axial flow passage 25 therethrough registering with opening 21. The outer end of flow passage 25 is bevelled to form the annular valve seat 25a. The inner face of bushing 24 is provided with the annular seal ring 26 adapted to form a seal about port 21 between the engaging annular surfaces of bushing 24 and receptacle 23. A plurality of hold-down screws 27 are screwed into body 10 about the rim of receptacle 23 and are positioned so that their heads project over the adjacent edge of bushing 24 to hold the latter in place in the receptacle. The external diameter of seat bushing 24 is preferably made somewhat smaller than the diameter of receptacle 23 to permit self-alignment of the seat bushing as will appear hereinafter.

An annular boss 28 extends outwardly of body 10 surrounding opening 22 which extends entirely through boss 28, the opening defining a cylindrical wall in which is slidably mounted a plunger 29 carrying a flexible seal ring 30, such as a conventional O-ring, circumferentially about its exterior to project therefrom into slidable sealing engagement with the wall of opening 22. An elongate rock-lever 31 is mounted on the exterior of recessed area 15 to extend longitudinally between openings 21 and 22. Lever 31 is rockably pivoted on a pivot pin 32 which is journalled in a transverse opening 33 positioned intermediate the ends of lever 31. The ends of pivot pin 32 are mounted in bearings 34—34 (Fig. 5) projecting from the surface of area 15 on opposite sides of the rock lever.

The lever arm 31a formed by the portion of lever 31 which extends between the pivot and opening 21 carries on its free end portion a valve 35 of generally disc-shape and constructed of resilient material, which is adapted to sealingly engage seat 25a. Valve 35 is secured to the lever arm 31a by a round-headed bolt 36 which extends through the valve and the lever arm and is fastened by means of a nut 37 which, when made up, compresses valve 35 between the bolt head 37a and a compression ring 38 positioned between the valve and the under-surface of lever arm 31a. Engagement of rounded bolt head 37a and valve 35 with the surface of seat 25a, when hold-down screws 27 have been loosened slightly, will act to move seat bushing to a position which is effectively centered with respect to the valve, the clearance between the seat bushing and receptacle 23 permitting the requisite degree of movement. Once the valve is seated properly in seat 25a, the hold-down screws may be tightened to fix the position of the seat bushing in the receptacle whereby to thereafter insure accurate seating of the valve in its seat.

The lever arm, designated 31b, on the side of pivot pin 32 opposite arm 31a, is provided on its under side near its outer end with a circular recess 39 adapted to receive the outer end of boss 28 with sufficient clearance so that the lever arm will rock freely relative to the boss. A projection 40 is disposed centrally of recess 39 and is adapted to be received loosely in a socket 41 provided in the outer end of plunger 29. Projection 40 is pivotally secured to plunger 29 by means of a wrist pin 42 which extends transversely through socket 41, passing through a transverse journal 43 in projection 40, journal 43 being slightly elongated laterally of projection 40 to prevent binding between the lever arm and the plunger during rocking movement thereof.

A spring detent 44 secured at one end to the surface of area 15 has its free end overlapping the free end of lever arm 31b to resiliently urge the latter inwardly toward the surface of area 15 or correspondingly to resiliently urge plunger 29 toward its inward position in opening 22.

The length of plunger 29 is such that when moved to its inward position, it will project into bore 11. The inner end 29a of plunger 29 is rounded to form a cam surface which is slidably engageable by the tapered end 45 of a tubular keeper sleeve 46 which is slidably mounted in bore 11 for retractible movement into and out of engagement with the inner end 29a of plunger 29, to urge the latter to its outward position and to releasably maintain it in that position. Bore 11 is provided with a tapered shoulder 11a just below opening 22 to form a stop engageable with tapered end 45 of sleeve 46 to limit the downward movement of sleeve 46 in body 10. The exterior of sleeve 46 is provided with longitudinally spaced circumferential upper and lower latching grooves 47 and 48, respectively (Figs. 1, 2, 3), which are adapted to cooperate with a resilient latch ring 49 mounted in a circumferential groove 50 provided in the wall of body 10 above opening 22 to releasably engage sleeve 46. When sleeve 46 is disposed in the lower position engaging the end of plunger 29 whereby to urge the latter outwardly (Figs. 2 and 3), latch ring 49 will be seated in upper groove 47 to hold the latter in the plunger-engaging position. When sleeve 46 is disposed in its upper or retracted position with respect to the end of plunger 29 (Fig. 4), latch ring 49 will be seated in lower groove 48 to hold the sleeve in the retracted position.

It will be understood that movement of the sleeve 46 may be effected by means of a suitable and generally conventional tool (not shown) which may be run through the bore of pipe string 14 from the surface to advance or retract keeper sleeve 46 as may be required.

It will be evident that when plunger 29 reciprocates in opening 22, lever 31 will be rocked about pivot 32. Outward movement of the plunger will cause inward movement of valve member 35 toward flow port-closing position on seat 25a (Figs. 2 and 3), while inward movement of plunger 29 will rock valve member 35 away from seat 25a to the port-opening position (Figs. 1 and 4). The lower face of lever arm 31a is tapered outwardly from a point opposite pivot 32 to its outer end to assure sufficient clearance between lever arm 31a and exterior of body 10 so that valve 35 may seat tightly in seat 25a. Journal 33 in lever arm 31 is made appreciably larger in diameter than pivot 32 to prevent binding of the lever arm during its operational movements.

One of the important features of this invention resides in making the effective area of opening 22, which for all practical purposes may be taken to be the effective area of plunger 29, larger than the effective area of opening 21, that is, the flow port through the body. By providing this areal relation, it will be seen that when the fluid pressure exteriorly of body 10 is greater than the fluid pressure interiorly thereof, the pressure forces acting on the relatively larger area of plunger 29 will be greater than those acting on valve 35 and will preferentially force the plunger inwardly, thereby rocking valve 35 to the open position as shown in Figs. 1 and 3. Similarly, when the fluid pressure inside body 10 is greater than that outside the body, the action of the internal pressure on the greater effective area of plunger 29 will urge the latter outwardly, thereby rocking valve member 35 to the closing position. Hence, it will be evident that the control valve will operate as an automatic check valve to prevent back-flow of fluid from the interior of body 10 to the exterior thereof whenever the internal pressure is greater than the external pressure. When the converse is true, valve 35 will remain open to pass fluid into body 10 from the exterior thereof, accordingly, the valve structure shown in Fig. 1 may be employed to control the admission of fluid, passing from outside casing 17 through inlet openings 20, through flow port 21 to the interior of the tubing string while preventing back-flow of fluid from the latter.

Keeper sleeve 46 may be employed to hold the valve in inactive position (Figs. 2 and 3) until such time as it may be desired to permit control valve 16 to operate.

Figs. 2 and 3 illustrate the manner in which the control valve may be combined with conventional gas lift valves to regulate communication between such gas lift valves and the interior of the production tubing string.

Fig. 2 illustrates the combination employing a form of gas pressure loaded gas lift valve described in my U.S. Patent No. 2,642,889. This valve is of the tubular type adapted to be connected directly into the pipe string as a part thereof. As shown in Fig. 2, tubular valve body 60 of gas lift valve is threadedly connected to the lower end of body 10 of the present control valve. Casing 17 is extended to form the outer casing 17a of the gas lift valve and is provided with slots 20a for admission of lifting gas from the exterior of the valve casing to the interior thereof. The entering gas acts upon flexible sleeve 61 which covers slots 20a in response to internal pressure of loading gas contained in an annular chamber 62 in body 60 of the gas lift valve. Gas entering slots 20a, by forcing sleeve 61 away from the slots, passes through the annular space 63 between casing 17a and the exterior of the gas lift valve body will flow past the flexible check valve 64 and into annular space 15a and thence through flow port 21 under the control of control valve 16.

The combination structure illustrated in Fig. 3 employs conventional gas or spring pressure loaded gas lift valves 69 of the kind illustrated, for example, in Howard et al. U.S. Patent No. 2,668,553, and Carlisle et al. No. 2,610,644. As these forms of gas lift valves are ordinarily designed to be mounted on the outside of the production tubing, the present control valve structure is modified slightly to connect the gas lift valves thereto so they may control the flow of fluid into casing 17 of the control valve. The present structure is modified by providing an adapter nut 70 which is screwed over the outside of the lower end of body 10 which may be provided with threads 71 to receive the nut. Nut 70 is provided with an upstanding annular neck 72 and the lower end of casing 17 is modified to extend over and enclose neck 72. Nut 70 is provided with a laterally extending lug 73 having a threaded socket 74 into which the discharge end of gas lift valve 69 may be screwed. A flow passage 75 extends from socket 74 through neck 72 into communication with annular space 15a of the control valve. Valve 69 will thus be in position to control, in the usual manner, the entrance of lifting fluid from about the exterior of the tubing string to the interior of casing 17. Passage of the fluid therefrom into the interior of the tubing will then be under the control of control valve 16.

In both the structures illustrated in Figs. 2 and 3, it will be evident that by moving keeper sleeve 46 to the valve-closing position, the gas lift valve may be kept inoperative to effect the movement of fluid through tubing string 14 until such time as it is desired to permit them to function to aid in lifting fluid through the tubing string.

Accordingly, it is possible by means of the control valve structure of the present invention to initially install a series of gas lift valves in a production tubing string together with a corresponding number of control valves of the present invention and by moving the keeper sleeves to the valve-closing positions, maintain the gas lift valves inactive while the well in which they are inserted flows naturally. When natural flow has declined to a point where artificial lift becomes desirable, it is only necessary to move the keeper sleeves to the valve-opening position to place the well on gas lift. This arrangement avoids the necessity for withdrawing the tubing string from the well to install gas lift valves thereon, which generally requires that the well be "killed" by pumping mud or water into it, a procedure which is time-consuming and expensive and which may be very hazardous to the well.

It will be understood that where a series of gas lift valves and control valves are installed in a pipe string, any one or all of the several control valves may be opened as found expedient. It will also be evident that the control valves of the present invention may also be closed off as desired, after having been opened, the keeper sleeve arrangement providing simple means for opening and closing the valves as desired.

Although the control valve structure previously described embodies the use of only one control valve 16, it will be obvious that two or even more of such valves may be angularly spaced about a single body, all of the valves being controlled by a single keeper sleeve.

Figs. 6 and 7 illustrate modifications of the plunger structure of the control valve. In Fig. 7 a projection 80 which corresponds to projection 40 of the first-described embodiment, extends from lever arm 31b in opening 22. An annular flexible diaphragm 81 has its inner periphery sealingly secured about the periphery of projection 80 and its outer periphery sealingly secured to the wall of opening 22. A ball 82 seated in the inner end of projection 80 functions like rounded end 29a of the first-described embodiment in being engageable by keeper sleeve 46 to move the plunger outwardly in order to rock the lever arm to the valve-closing position. Diaphragm 81 forms a flexible seal between the plunger and the cylinder wall which permits reciprocation of the plunger and provides the larger effective area which is acted upon by fluid pressure interiorly and exteriorly of body 10.

In Fig. 6, diaphragm 81 is replaced by a flexible bellows 83 but functions otherwise in the same manner as seal ring 30 of Fig. 4 and diaphragm 81 of Fig. 7.

It will be understood that numerous changes and alterations may be made in the details of the illustrative embodiments within the scope of the appended claims but without departing from the spirit of this invention.

What I claim and desire to secure by Letters Patent is:

1. A plunger actuated valve, comprising, a tubular body having open ends and a pair of longitudinally spaced openings through the wall thereof, a lever member rockably pivoted intermediate its ends on the exterior of said body at a point between said openings, sealed plunger means reciprocable in one of said openings and operably secured to one arm of said lever member, and a valve member carried by the other arm of said lever member for movement thereby into and out of closing engagement with the other of said openings to permit fluid flow into said tubular body through said other of said openings when said plunger means moves inwardly in said one of said openings and into closing engagement with said other of said openings to prevent fluid flow through said other of said openings when said plunger means moves outwardly in said one of said openings.

2. A plunger actuated valve according to claim 1 wherein said plunger means comprises a cylindrical piston, and a seal packing circumferentially disposed in slidable sealing engagement between said piston and the surrounding wall of said one of said openings.

3. A plunger actuated valve according to claim 1 wherein said plunger means comprises a rigid core, and an annular flexible diaphragm sealingly connecting the core to the surrounding wall of said one of said openings.

4. A plunger actuated valve according to claim 1 including retractible keeper means mounted interiorly of the body engageable with said plunger means to hold the same outwardly in said one opening whereby to maintain said valve member in closed engagement with said other opening.

5. A plunger-actuated valve, comprising, a tubular body having open ends and a pair of longitudinally spaced openings through the wall thereof, a lever member rockably pivoted intermediate its ends on the exterior of said body at a point between said openings, sealed plunger means reciprocable in one of said openings and operably secured to one arm of said lever member, and a valve member carried by the other arm of said lever member for movement thereby into and out of closing engagement with the other of said openings to permit fluid flow into said tubular body through said other of said openings when said plunger means moves inwardly in said one opening and into closing engagement with said other of said openings when said plunger means moves outwardly in said one of said openings, the effective area of said plunger means exposed to fluid pressure being greater than that of said other opening.

6. A plunger-actuated valve, comprising, a tubular body having a pair of longitudinally spaced openings through the wall thereof, a lever member rockably pivoted intermediate its ends on the exterior of said body at a point between said openings, sealed plunger means reciprocable in one of said openings and operably secured to one arm of said lever member, a valve member carried by the other arm of said lever member for movement thereby into and out of closing engagement with the other of said openings in response to outward and inward movement respectively, of said plunger means in said one opening, the effective area of said plunger means exposed to fluid pressure being greater than the corresponding area of said other opening, and retractable keeper means mounted interiorly of the body engageable with said plunger means to hold the same outwardly in said one opening whereby to maintain said valve member in closed engagement with said other opening.

7. In combination, a tubular body adapted to be connected into a pipe string as a part thereof, said body having a pair of longitudinally spaced openings through the wall thereof, a lever member rockably pivoted intermediate its ends on the exterior of said body at a point between said openings, sealed plunger means reciprocable in one of said openings and operably secured to the adjacent arm of said lever member, the other of said openings defining a flow port, a valve member carried by the opposite arm of said lever member for movement thereby into and out of closing engagement with said flow port in response to reciprocation of said plunger means in said one opening, a housing enclosing said body and having a fluid inlet therein, and valve means controlling said inlet, said inlet when open communicating with said flow port to permit fluid flow through said inlet and said flow port into said tubular body when said valve member is out of closing engagement with said flow port.

8. The combination according to claim 7 including retractible keeper means mounted interiorly of said body engageable in its advanced position with said plunger means to hold the same outwardly in said one opening whereby to maintain said valve member in closed engagement with said flow port.

9. The combination according to claim 8 wherein said retractible keeper means comprises a tubular sleeve slidable in the bore of said body.

10. The combination according to claim 8 including releasable latch means for releasably holding said keeper means in said advanced position.

11. A control valve for pipe strings, comprising, a tubular body connectible into a pipe string to form a part thereof, a tubular casing concentrically enclosing said body to define an annular space therebetween and having an inlet communicating with said space, valve means controlling said inlet, a flow port through the wall of said body providing communication between said annular space and the interior of said body, a rock lever pivotally mounted in said annular space, a valve member mounted on one end of said lever for movement thereby into and out of closing engagement with said flow port, and sealed plunger means radially reciprocable through the wall of said body and operably secured to the opposite end of said rock lever whereby movement of said plunger means to its outward position will rock said valve member to the port-closing position and inward movement of the plunger means will rock said valve member to the port-opening position.

12. A control valve according to claim 11 wherein the effective area of said plunger means exposed to fluid pressure is greater than the area of said flow port.

13. A control valve according to claim 11 including keeper means mounted interiorly of said body for releasably holding said plunger means in said outward position.

14. A device of the type described including a hollow body having open opposite ends and a pair of longitudinally spaced lateral openings; a valve member for closing one of said lateral openings; reciprocable means in said other of said openings; and means connecting said reciprocable means and said valve member to cause said valve member to open said one of said lateral openings when said reciprocable means moves inwardly in said other of said openings and to close said one of said lateral openings when said reciprocable means moves outwardly in said other of said openings.

15. The device of claim 14 including longitudinally movable keeper means in said hollow body engageable with said reciprocable means to hold said reciprocable means in an outward position wherein said valve member closes said one of said lateral openings.

16. A device of the type described including a hollow body having open opposite ends and a pair of longitudinally spaced lateral openings; a valve member for closing one of said lateral openings; reciprocable means in said other of said openings; and means connecting said reciprocable means and said valve member to cause said valve member to open said one of said lateral openings when said reciprocable means moves inwardly in said other of said openings and to close said one of said lateral openings when said reciprocable means moves outwardly in said other of said openings, said reciprocable means being pressure responsive whereby it moves outwardly to cause said valve member to close said one of said lateral openings when the pressure within said tubular body exceeds the pressure without said body.

17. A control valve for pipe strings comprising a tubular body connectible into a pipe string to form a part thereof, a housing enclosing said body to define a space therebetween and having an inlet communicating with said space, valve means controlling said inlet, a flow port through the wall of said body providing communication between said space and the interior of said body, a lever pivotally mounted in said space, a valve member mounted on one end of said lever for movement thereby into and out of closing engagement with said flow port, and sealed plunger means radially reciprocable through the wall of said body and operably secured to the opposite end of said lever whereby movement of said plunger means to its outward position will move said valve member to the port closing position and inward movement of the plunger means will move said valve member to the port opening position.

18. A control valve according to claim 17 wherein the effective area of said plunger means exposed to fluid pressure is greater than the area of said flow port.

19. A control valve according to claim 17 including keeper means mounted interiorly of said body releasably holding said plunger in said outward position.

References Cited in the file of this patent

UNITED STATES PATENTS

| 299,801 | King | June 3, 1884 |

FOREIGN PATENTS

| 668 | Great Britain | 1853 |
| 382,681 | France | Dec. 14, 1907 |